United States Patent [19]
Shufflebarger et al.

[11] 3,787,023
[45] Jan. 22, 1974

[54] BELLOWS VALVE

[75] Inventors: Earl D. Shufflebarger; Bernard J. Gallagher, both of Mentor; David M. Simko, Parma Heights; John R. Boylan, Cleveland Heights, all of Ohio

[73] Assignee: Nupro Company, Cleveland, Ohio

[22] Filed: Aug. 5, 1971

[21] Appl. No.: 169,316

[52] U.S. Cl. ........................................... 251/335 B
[51] Int. Cl. ............................................ F16k 41/04
[58] Field of Search......... 251/335 B, 81, 77, 86, 87

[56] References Cited
UNITED STATES PATENTS

| | | | |
|---|---|---|---|
| 2,740,425 | 4/1956 | Garland | 251/86 X |
| 2,848,187 | 8/1958 | Henry | 251/86 UX |
| 2,881,602 | 4/1959 | Baker et al. | 251/81 X |
| 3,105,518 | 10/1963 | Kunz | 251/77 X |
| 3,528,087 | 9/1970 | Perkins | 251/335 B |
| 2,682,386 | 6/1954 | Lindsay | 251/335 B |
| 2,114,139 | 4/1938 | Crosthwait, Jr. et al. | 251/335 B |
| 2,308,183 | 1/1943 | Lewis et al. | 251/335 B |
| 2,524,730 | 10/1950 | Lawhon | 251/335 B |
| 3,510,100 | 5/1970 | Makusay et al. | 251/86 X |
| 3,625,474 | 12/1971 | Juede | 251/335 B |

Primary Examiner—Samuel Scott
Attorney, Agent, or Firm—Fay, Sharpe and Mulholland

[57] ABSTRACT

A valve including a bonnet mounted on a body and having an actuator carried in a central passage in the bonnet. The body includes a fluid passageway connecting an inlet and an outlet, an annular sealing seat in the passageway and a bore intersecting the passageway substantially coaxially with said seat. The central passage in the bonnet is aligned substantially coaxially with the bore in the body, and the inner end of the actuator is connected to a non-rotatable stem which is reciprocated by the actuator into and out of sealing engagement with the seat. The connection between the stem and the actuator comprises a cup on the lower end of the actuator into which the upper end of the stem projects, and a groove around the periphery of the upper end of the stem into which a pair of detents project from the wall of the cup. Thereby the stem and actuator are locked together for coordinated axial movement while allowing relative rotational movement. The cup and the upper end of the stem present opposed, substantially cone-shaped surfaces for abutting a friction reducing ball held therebetween. The ball minimizes the amount of torque transmitted from the rotatable actuator to the non-rotatable stem. The lower end of the stem carries sealing means for co-acting with the valve seat and includes a plug mounted within a polygonal body having a plurality of rounded guiding corners for engaging the bore wall. A bellows surrounds a portion of the stem with its lower end bonded to the stem and its upper end bonded to a weld ring. The weld ring is sealingly clamped between the body and the bonnet. Concentric grooves are formed in the weld ring with at least one of the grooves opening upwardly toward a flat face on the lower end of the bonnet. The upwardly opening groove contains an O-ring sealingly compressed between the flat face of the bonnet and the bottom of the groove. Another groove is sufficiently close to an edge of the weld ring as to form an upstanding flange of radial thickness not substantially greater than the thickness of the bellows. An outwardly flaring surface merges with the terminus of the bonnet passage and its maximum diameter is greater than the diameter of the crest of the flange which is bonded to said bellows.

22 Claims, 9 Drawing Figures

PATENTED JAN 22 1974 3,787,023
SHEET 1 OF 2
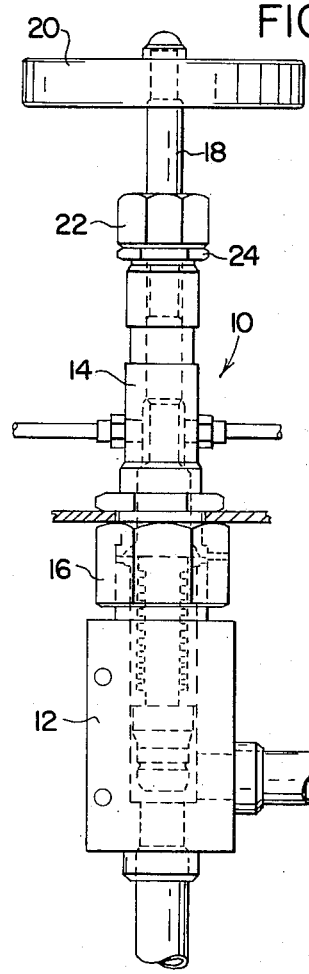
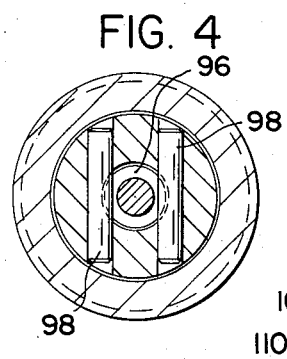
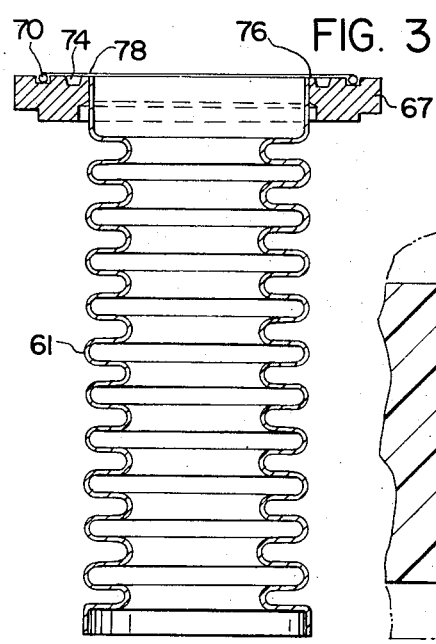
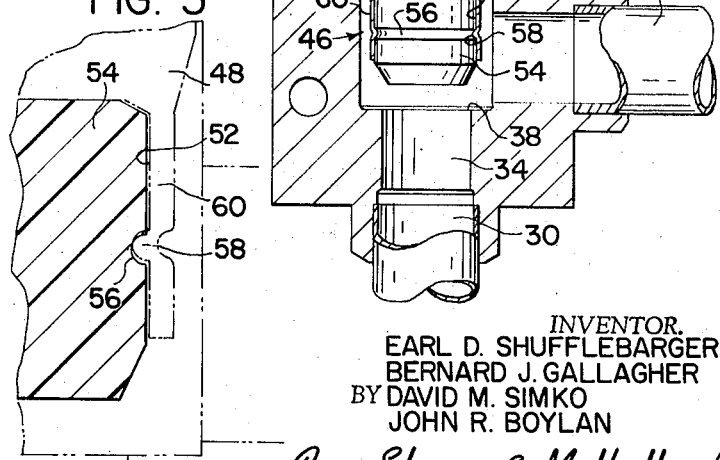
INVENTOR.
EARL D. SHUFFLEBARGER
BERNARD J. GALLAGHER
BY DAVID M. SIMKO
JOHN R. BOYLAN
*Fay, Sharpe & Mulholland*
ATTORNEYS

PATENTED JAN 22 1974 3,787,023

INVENTOR.
EARL D. SHUFFLEBARGER
BERNARD J. GALLAGHER
BY DAVID M. SIMKO
JOHN R. BOYLAN

*Fay, Sharpe & Mulholland*
ATTORNEYS

BELLOWS VALVE

BACKGROUND OF THE INVENTION

This is an improvement of the invention shown and described in U.S. Pat. Nos. 3,278,156; 3,428,291 and 3,491,789. It is similarly applicable to cryogenic, high temperature, vacuum and high pressure environments.

Common features in the valve of this application and the valve shown in U.S. Pat. No. 3,491,789 to Callahan et al. include a bonnet clamped to a valve body by a union nut, an actuator projecting into a central passage in the bonnet, a stem connected to the lower end of the actuator and projecting through a bore into a flow passage in the body, a tip on the lower end of the stem for sealingly engaging a seat in the flow passage and a bellows surrounding a portion of the stem.

One improvement provided by the valve of this invention includes an elongated threaded connection between the stem and the bonnet having an L/D ratio of approximately 1.5:1 (where L is the thread length and D is the thread diameter). The increased L/D ratio provides better guiding for the stem and minimizes thread stripping. The requirement of improved guiding and higher strength threads is necessitated by the handling of higher pressures in the valve.

Two diametrically opposed apertures are formed in the bonnet below the threaded bonnet-stem connection and above a back seat. Cooling and heating fluid may be passed through one of the apertures into the bonnet and out through the other aperture. Alternatively, one aperture could be plugged and a sensor could be provided in the other aperture for leak detection. The provision of a back seat below the sensor or cooling apertures minimizes contamination of cooling fluid passing through the valve should the bellows leak. This is an improvement over the structure of the valve shown in the Callahan et al. U.S. Pat. No. 3,491,789 where the back seat for minimizing gross leakage is located above the cooling apertures.

The connection between the actuator and the stem is particularly a problem in valves where extremely high pressures or extremely low pressures with diverse temperature changes of large magnitude are encountered. Two pins are provided by this invention which project through the walls of the cup-shaped end of the actuator and through a semicircular groove in the upper end of the stem. The pins are located in diametrically opposed positions. Thereby, when the stem tends to stick or adhere to the valve seat the two pins will engage the groove walls as the actuator is retracted and induce dual vertical forces on the stem. This balanced upward force application prevents canting of the stem as sometimes is the case when a single pin is used such as is shown in the structure of U.S. Pat. No. 3,491,789.

The shape of the groove in the stem has been improved from a flat sided trough as shown in the Callahan et al. patent to a semicircular shaped groove with chrome plated wear surfaces. The chrome plating minimizes friction and also hardens the surface to minimize wear. The groove in the stem structure of the Callahan et al. patent allows maximum radial distortion at the groove section during compression; the bottom of the groove being the minimum section of the stem. It is also the section where the maximum radial "bulge" results during compression which tends to dislocate the locking pin. With the semicircular shaped groove of this invention, radial pin displacement is not so much of a problem.

A weld ring is clamped between the bonnet and the body and a groove in the upper surface of the weld ring contains a hollow metal O-ring which seals against a planar surface of the bonnet. The bellows structure is welded to the inner periphery of the weld ring which in some cases results in a raised weld bead projecting above the ring toward the bonnet. To prevent the bonnet from engaging the weld bead it is flared at its lower end and the planar surface has a minimum inside radius which is greater than the maximum weld bead outside radius.

In the valve design of this invention the bellows structure is welded to a flange on the stem and extends upwardly to the weld ring where it is again welded. This configuration of the bellows structure is a departure from the Callahan et al. patent structure and represents a substantial improvement. With the Callahan et al. patent structure fluid contacts the interior of the bellows. In the valve of this application fluid contacts the exterior of the bellows. When compared to the bellows structure of the Callhan U.S. Pat. No. 3,491,789, the bellows of this invention may be said to be inverted. The inverted bellows design offers many advantages.

When a fluid system must be purged the bellows structure of this invention allows for much easier cleaning when the valve is disassembled because the fluid contact area of the bellows is at the exterior rather than the interior of the structure. In addition, system pressure acts on the outside of the bellows, rather than the inside. This is very desirable in larger bellows valves because it reduces the possibility of the bellows "slinking" and results in longer cycle life. Also this design is recommended for applications such as liquid metal, where the system fluid must be heated to flowing conditions prior to operating the valve. Since the system fluid is in contact with the body of the valve in the bellows area maximum heat transfer is possible.

The lower end of the stem includes a coaxially mounted stem tip. The tip consists of a polygonal body connected to the stem and a plug or insert member crimped into a cavity formed in the lower face of the body. A plurality of flow passages about the body llows for evacuation of the valve for vacuum service. In addition, the body provides a plurality of rounded corners for centering and guiding the stem within the valve body bore. The plug, ordinarily of a different material than the body, is press fitted into the cavity of the body and is compressed against the bottom of the cavity by crimping. This operation is performed prior to the assembly of the tip with the stem. Crimping of the plug tends to minimize the migration of fluid behind the plug which could in some cases cause the plug to "blow-out" of the cavity when there is a sudden change in pressure. In addition, crimping procedures a minimum of dead space in the cavity which reduces contamination when the system is changed from one fluid to another.

BRIEF DESCRIPTION OF THE INVENTION

The valve of this invention includes a bonnet connected to a body by a union nut. The body includes an inlet and an outlet connected by a flow passage with an intermediate annular sealing seat surrounding the flow passage. A reciprocable, non-rotating stem projects through a bore in the body and is adapted to seal against the seat, the stem being coaxially aligned with both the seat and the bore.

A portion of the stem within the bore is surrounded by a bellows structure. The lower end of the bellows structure is bonded to the stem and its upper end is bonded to a weld ring. The weld ring is in turn clamped between the upper end of the body and the lower end of the bonnet thus restricting fluid to a space in the body which is exterior of the bellows.

The upper end of the stem includes a semicircular shaped groove formed in its periphery. The stem projects into a cup-shaped portion on the lower end of an actuator. The actuator extends upwardly from the stem through a central passage in the bonnet. Two pins project through the side walls of the cup-shaped portion of the actuator and lock the stem and actuator together.

The opposed end faces of the stem and cup-shaped cavity include concave conical surfaces which hold a polished ball for minimizing both friction and the transmission of rotational forces from the actuator to the stem.

A particularly long thread is provided on the actuator to engage mating threads on the interior of the bonnet. The increased thread length provides a guide for the actuator to assist in centering the stem within the bore and to minimize thread stripping at high pressure.

Near the lower terminus of the central passage of the bonnet is an outwardly flaring frusto-conical surface particularly designed such that the lower end of the bonnect contacts only a portion of the weld ring connected to the upper end of the bellows. The weld ring includes two upwardly facing grooves with the outermost groove containing a O-ring which seals a lower flat face of the bonnet and the bottom of its groove. The second or innermost groove is formed to provide an upwardly extending flange near the inner periphery of the ring which is not substantially thicker than the bellows. If the flange were substantially thicker than the bellows it would act as a heat sink during the welding process and inhibit the formation of a weld bead.

Often welding produces a weld bead which projects above the original surface of the weld ring. Such a projection of the bead could prevent sealing between the O-ring and the bonnet. To alleviate this potential problem the flared surface at the lower end of the bonnet has a minimum inside diameter which is greater than the maximum outside diameter of the crest of the flange at the inner edge of the weld ring. Thus, the bonnet cannot contact the weld bead.

BRIEF DESCRIPTION OF THE DRAWINGS

FIG. 1 is an elevational view, partly in phantom, of the preferred embodiment of the valve of this invention;

FIG. 2 is an enlarged elevational view, partly in section, of a portion of the preferred embodiment of the valve of this invention;

FIG. 3 is a sectional view of the bellows and weld ring of the valve of this invention;

FIG. 4 is a sectional view taken along line 4—4 of FIG. 2;

FIG. 5 is an enlarged fragmentary sectional view of the stem tip of this invention;

PREFERRED EMBODIMENT

Figure 6:
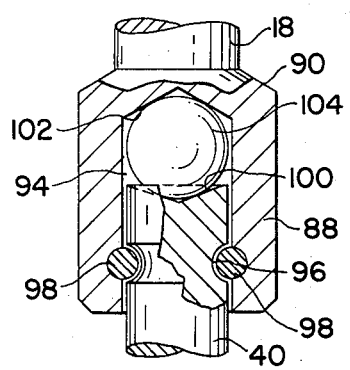
FIG. 6 is an enlarged fragmentary view of the connection between the stem and actuator of the valve of this invention, partly in section.

Referring to FIGS. 1 and 2, the valve 10 includes a body 12 joined to an elongated bonnet 14 by a union nut 16. An actuator 18 projects upwardly from the bonnet and a handle 20 is attached to its outer end. A packing nut 22 is threadably received over the upper end of the bonnet 14 to hold packing 26 in compression against actuator 18. A jam nut 24 locks the packing nut 22 in place to prevent accidental loosening and relaxation of the compression on the packing 26.

Packing 26, in the preferred embodiment, is made up of a three piece Teflon or asbestos-Inconel packing system fully contained by metal components on all sides. This packing system provides back-up sealing over the primary bellows seal to be described below.

The body 12 is provided with an inlet 30 and an outlet 32 connected by a fluid flow passageway 34. A bore 36 intersects the passageway 34. Valve seat 38 is defined by body 12 intermediate the inlet and outlet.

Coaxially disposed within the bore 36 is a stem 40. An aperture 44 (FIG. 7) at the lower end of the stem receives a stem tip 46 in threaded engagement. The tip includes a body 48 having a polygonal cross-section and a plug or insert 54 held within the body. Preferably the body 48 is machined from a hexagonal piece of bar stock but, the word "polygonal" as used herein is intended to define any body having a plurality of sides greater than two. Rounded corners 50 are provided on the body 48 which is only slightly smaller in diameter than the bore 36. The corners 50 provide six sliding surfaces for guiding the tip and keeping it centered in the bore while at the same time providing six flow passages about the body for evacuating fluid from the valve. If desired, the guide surfaces may be chrome plated. A cavity 52 is formed in the lower end of the body 48. Prior to assembly of the body with the stem, the plug 54 is press fitted into the cavity and subsequently crimped into place.

As to a choice of materials, it is preferred that the body 48 be stainless steel (type 316) and the lug be KEL-F or STELLITE. The two different plug materials give a wide variety of useful applications. During operation of the valve the tip 46 must take several forces including torsion, compression, etc. and it is preferred that the body 48 be made of a different material than the plug 54. However, it is possible that the plug and body could be machined as a single element or the tip could be machined directly on the lower end of the stem. Clearly, replaceable tips 46 allow a wider variety of uses for the valve than if the tip were made integral with the stem.

In the case of a STELLITE plug 54, a groove 56 is preformed therein as it is a particularly hard material. The plug is press fitted into the cavity 52 and an inwardly extending rib 58 is crimped into the sidewall 60 of the body 48. Note particularly in FIG. 5 that the inner surface of the rib 58 engages the groove 56 in a manner to put the upper portion of the plug 54 in compression against the cavity wall. Thus, the plug will substantially fill the cavity and minimize vertical play, thereby minimizing the possibility of migration of fluid behind the plug.

Where the plug material is KEL-F the outer surface is formed in a cylindrical shape and the deformation of the sidewall 60 (forming the rib 58) forms a groove 56 in the softer KEL-F material by cold flow. The KEL-F is placed in compression against the cavity wall for the same reason as outlined above with respect to the STELLITE plug.

A bellows 61 is bonded at one end to a ridge 62 (FIG. 7) projecting radially outwardly from the stem 40. The ridge 62 has a groove 64 formed in its lower surface to define a flange 66 not substantially thicker than the bellows 61. The purpose of the flange 66 will be explained below.

The bellows extends substantially to the upper terminus of the bore 36 where it is joined to a weld ring 67. The weld ring 67 includes two circumferential grooves 68, 74 cut in its upper face. The outermost groove 68 contains a hollow metal O-ring 70. In the preferred embodiment the O-ring material is silverplated Iconel-X. The union nut 16, which engages a flange 73 on the bonnet 14, clamps the lower flat surface 72 of the bonnet in sealing engagement with the O-ring 70. The innermost groove 74 is cut sufficiently near the inner periphery of the weld ring as to provide an upstanding flange 76 not substantially thicker than the bellows 61. Preferably at its crest 78 the flange 76 is approximately in the range 2 – 3 ½ times the thickness of the bellows 61. Similar thickness ranges are provided by flange 66 on the ridge 62.

The reason for the criticality of the thickness of flanges 76 and 66 is that the mass of the ring or ridge being welded to the bellows 61 is so much greater than the mass of the bellows itself that the ring or ridge acts as a heat sink. Where the crest width is substantially greater than the bellows width, the flange will not be heated to welding temperature at the same time as the bellows. Unless the dimensional relationship just described is maintained, the bellows may melt while the ring or ridge is being heated with the result that a sound weld will not be formed.

The stem 40 is generally cylindrical in configuration and is slightly smaller in diameter than the inside diameter of the bellows 61. Additionally, the bellows is only slightly smaller in diameter than the bore 36. These close dimensional relationships provide a certain amount of guiding and aligning for the stem tip 46. Stainless steel (300 series) is the preferred bellows material. Inconel or other alloys may also be used. Any compatible materials may be used for the stem 40 and the weld ring 67.

Figure 8:
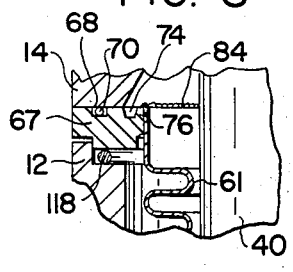
FIG. 8 is a sectional view of a modification of the joint between the bonnet, weld ring and body using ring sealing.
Figure 7:
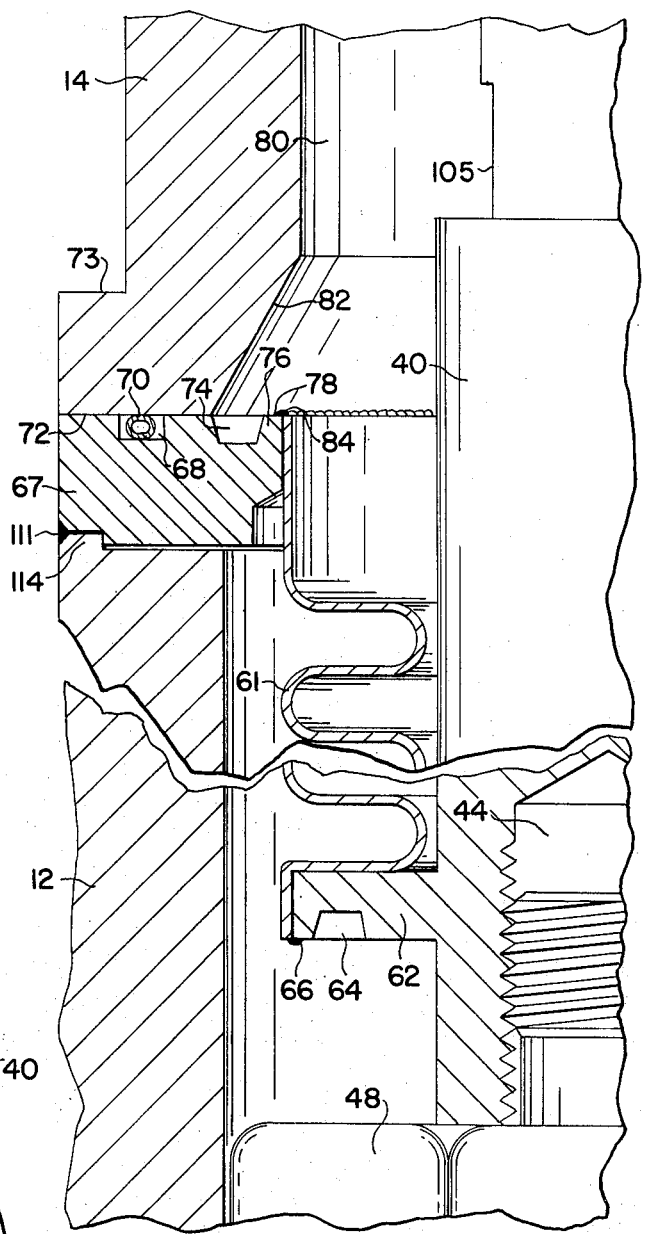
FIG. 7 is an enlarged fragmentary sectional view of the preferred embodiment of the connections between the bellows and the stem, the bellows and the weld ring, and the bonnet, weld ring and body.

The bonnet 14 is provided with a central passage 80 into which the upper end of the stem 40 projects. The central passage 80 is coaxially aligned with the stem 40 and the bore 36 and a flared frusto-conical surface 82 is provided at its lower terminus. As best illustrated in FIGS. 7 and 8, the flared surface 82 has its largest diameter at the lower flat surface 72 and is large enough that it will clear the crest 78 of the flange 76 on the weld ring. Thus there is no possibility of direct engagement of the bonnet with the weld bead 84. Such engagement could impair sealing at the O-ring 70.

As an alternate embodiment a step, recess or undercut portion may be provided at the base of the bonnet so that the bonnet does not engage the weld bead 84. As used herein the term relieved surface should be considered generic to a flared surface or a step, recess or undercut portion.

The actuator 18 is threaded at 86 to interengaging threads on the interior of the bonnet. In the preferred embodiment Acme power transmission threads are used. It is preferable that the ratio of thread length to thread diamete (L/D) be approximately 1.5:1 or greater. This ratio provides greater guiding capabilities to keep the actuator 18, stem 40 and seat 38 coaxially aligned. It also provides greater resistance to high pressure.

The actuator extends downwardly toward the stem 40 and on its lower end includes a cup-shaped portion 88 with a frusto-conical shoulder 90 defined at the juncture of the actuator shank and the cup-shaped portion. The frusto-conical shoulder 90 cooperates with a similarly configured transverse shoulder 92 on the bonnet. Together the shoulders 90 and 92 serve as a back seat to prevent gross leakage of hazardous fluids from the valve in case of an accident in which the bellows 61 may rupture.

The upper end of the stem 40 projects into a recess 94 in the interior of the cup-shaped portion 88. An annular, semicircular shaped groove 96 (FIG. 6) is formed in the upper end of the stem and loosely receives diagonally opposed free floating pins or detents 98 carried by the cup-shaped portion. Preferably, the pins 98 project through apertures in the sidewall of the cup-shaped portion and may be retracted when it is desirable to disconnect the actuator 18 from the stem 40. However, it is possible to connect the stem and actuator by deforming the sidewall of the cup-shaped portion after the upper end of the stem has been inserted into the recess 94. The deformed sidewalls would thus have nipple-like detents projecting into the groove 96, permanently locking the stem to the actuator. Removable detents are preferred, however.

The upper end of the stem further includes a conical depression 100 with he apex of the depression being on the longitudinal axis of the stem 40 and aligned with the apex of a similar conical depression 102 formed in the bottom of the recess 94 in the cup-shaped portion. A ball 104 is interposed between the upper end of the stem and the bottom of the recess with portions of the ball being received in the conical depressions 100 and 102. The ball allows relative rotational movement between the stem and the actuator with a minimum of friction. In the preferred embodiment the ball is a precision ball bearing.

The dimensional relationships between the cup-shaped portion 88 of the actuator, the pins 98, the ball 104 and the conical surfaces 100, 102, together with the resilience of the bellows 61 and the fluid pressure in the system cause the ball 104 to be retained in the recess 100, 102. With the valve in a closed position, the pins 98 are located centrally of the groove 96 and transmit no torque to the stem 40 during valve actuation. In the event that the stem tip 46 should stick to the seat 38 for any reason, upward movement of the actuator 18 will move the pins 98 to a position in engagement with the sidewall of the groove 96 thereby exerting a light but positive lifting force on the stem.

Two diagonally opposed pins are preferred because they impose equal vertical lifting forces on diametrically opposed surfaces of the upper wall of the groove 96, whereas, a single pin transmits an unbalanced force which would tend to cant the stem 40 relative to the bore 36 and misalign the stem tip 46 with respect to the seat 38.

The groove 96 is provided with a polished chrome plated surface to minimize frictional contact between the pins 98 and the groove and further to make a harder surface for minimizing wear. The semicircular shaped groove surface minimizes barrel bulge which is always greatest at the minimum cross-section of a bar under compression. In this case the stem 40 acts as a bar under compression when the valve is closed. The provision of a semicircular shaped groove minimizes the barrel bulge effect and tends to minimize the radial deflection of the pins due to such a barrel bulge.

To reduce further the possibility of torque transfer to the bellows when actuating the stem, the ball 104 has a diameter as large as possible. The ball 104 contacts the conical surface 100 in line contact with the line being substantially a circle coaxial with the stem. A similar condition exists with respect to the conical surface 102. The result is a desirable wide distribution of the load and a consequent reduction in the unit load thus minimizing the possibility of galling between the ball 104 and the conical surfaces 100, 102. As a further precaution against galling and wear, the ball 104 and surfaces 100, 102 are highly polished to a finish of 63 micro inches or better. The ball and all surfaces in contact with the ball have a hardness of at least 55 on the Rockwell "C" scale. A lubricant may be used to even further reduce undesirable friction.

With respect to the operation of the stem, the shortest possible stroke is the most desirable. There is an inverse relationship between the degree of flexture of the bellows walls and the useful life of the bellows.

In an exemplary valve the pins connecting the two stem sections are approximately 0.078 inches in diameter whereas the groove is approximately 0.125 inches in diameter.

Contrary to the structure of the aforementioned Callahan et al patent, (where the bellows is always operating in tension) the bellows of the valve of this invention is operating approximately 20 percent in tension (extension) and 80 percent in compression. That is, in operation there is a null point at which the bellows is at rest. When it is extended from the null point it is in tension. When it is compressed from the null point it is in compression. The bellows acts somewhat as a spring in this relation and will expand or contract naturally as would a spring under similar circumstances.

Because there may be a need for changing the stem tip 46 after the bellows 61 is welded to the stem 40, wrench flats 105 are provided on the stem above the bellows. This is necessary because the turning or torquing action necessary to loosen or tighten the tip might result in a twisting of the bellows. Since the bellows may fail in torsion the flats 105 provide a gripping surface for a wrench and thus protect the bellows against twisting.

As shown in FIG. 2, the valve may include a pair of opposed apertures 106, 108 in the walls of the bonnet 14. A tube stub 110 is received in each of these apertures and is secured to the bonnet to serve as a connection element for a fluid line. The tube stub includes a passage in communication with the interior of the bonnet. By using a pair of stubs the bonnet design lends itself to a system where either a cryogenic or a high temperature medium may be passed through the valve. During high temperature operation, for instance, a medium could be introduced through the stubs 110 which would continually dissipate heat allowing for satisfactory valve operation. Strip heaters have been applied to the body to minimize heat loss in some applications. During cryogenic service a cold refrigerant could be passed through the stubs to minimize heat transfer to the cryogenic fluid.

For most applications of the valve, however, the tube stubs are not necessary.

The use of a single tube stub is also contemplated. In such applications the stub could be used to pipe fluid back through a reservoir or to actuate an alarm in the event of bellows failure. Another potential use would be to allow a vacuum to be produced in the bellows during cryogenic service or, conversely, to permit pressurization of the valve in the bellows to attain higher pressure service. Pressurization outside or above the bellows equalizes the load on the bellows resulting in increased cycle life of the bellows.

In high pressure applications, the loading on the stem actuator 18 is substantial and frequently results in galling of the threads 86. As a result, the actuation of the valve becomes very difficult. By having a different degree of hardness on the actuator threads as compared to the hardness on the bonnet threads the tendency to gall is virtually eliminated. Preferably the actuator threads are harder than the mating threads in the bonnet.

Turning now to the sealing mechanism between the upper end of the body 12 and the lower end of the weld ring 67, it may be observed in FIG. 2 that the union nut 16 compresses the weld ring 67 between the lower end of the bonnet 14 and the weld ring 67 between the lower end of the bonnet 14 and the upper end of the body 12.

The lower portion of the weld ring 67 is welded at 111 directly to the body 12. The periphery of the body is raised slightly at 114 and the ring 67 has a cooperatively shaped recess (thereby providing a slight offset).

It should be noted that the raised portion 114 on the body is slightly higher than the mating recess in the weld ring thereby preventing the ring from bottoming prematurely and thus leaving a relatively large gap to be filled by weld material 111. The raised portion 114 is preferably 0.020 inches higher than the cooperating recess in the weld ring.

In the preferred embodiment the bellows to stem, bellows to ring, and bellows assembly to body connection are Heli-arc welded providing an all metal, hermetically sealed valve. The bellows assembly can also be sealed to the body using a weld ring of the type shown in FIG. 7 and a solid metal O-ring as will be described below.

If desired, a bonnet port 112 may be formed in the union nut 16 by means of which the integrity of the primary seal between the body, bonnet and ring may be tested by helium leak test procedures.

FIG. 8 shows a seal structure at the weld ring where it is desired to eliminate the weld at the body. In this embodiment (which is preferred when a weld is not used) a solid metal O-ring 118 is placed between the lower face of the weld ring 67 and the upper face of the body to provide sealing. It should be noted that the weld ring 67 of FIG. 8 is essentially the same as the weld ring of FIG. 7. The only difference is that O-ring 118 of FIG. 8 is substituted for weld 111 of FIG. 7. The cooperating rise and recess permit the weld ring to be used interchangeably without appreciably affecting the bellows stroke.

Figure 9:
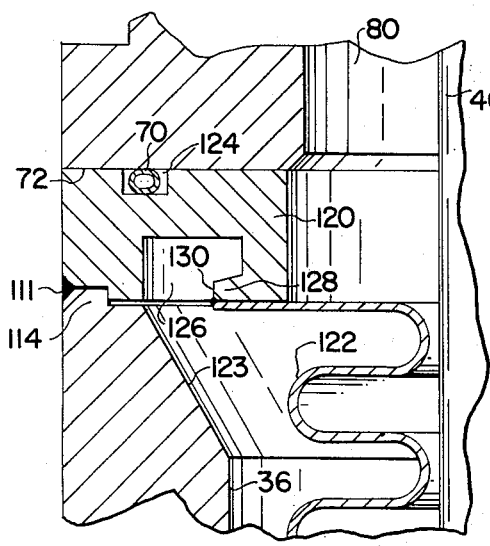
FIG. 9 is a sectional view of a further modification of the joint between the bellows and the weld ring.

FIG. 9 shows an alternate weld ring structure and an alternate weld-ring-beellows joint structure. The valve body is provided with a relieved surface or flare 123 near the upper terminus of the bore 36. Only a single groove 124 is formed on the upper face of the weld ring 120. A second groove 126 is formed near the ring lower surface to provide a flange 128 having a crest suitable for welding to the periphery of the bellows 122.

Other designs and modifications of the weld ring and the joint between the bonnet and the valve body may be obvious to those having ordinary skill in the art and such are within the contemplation of this invention. This invention should not be considered limited to any particular design of the weld ring itself.

As has previously been noted the bellows of the preferred embodiment operates 20 percent in tension (extension) and 80 percent in compression. Stated in other words the bellows is flexed 20 percent beyond the free state position when the valve is closed. It is compressed 80 percent beyond the free state position when the valve is opened. The pins 98 come into operation to engage the walls of groove 96 as the valve is opened to positively pull the bellows and stem upwardly beyond the "null" point of the bellows to place the bellows in compression. In prior art valves of the type shown in the Callahan patent the bellows is compressed beyond the free state position when the valve is closed. It is not extended, however, beyond the free state position when the valve is opened. Thus, the pin of such prior art valves always stays out of contact with the flanks of the groove wall as the valve is opened except when the valve sticks to the seat.

The alternate tension-compression states of the bellows of this invention increases bellows life since the extension and compression strokes are reduced in magnitude as compared to the compression stroke of the prior art valves noted above.

The 20 – 80 tension-compression stroke ratio is characteristic of the preferred embodiment. Other ratios should be considered within the spirit of the invention.

This invention was designed to be incorporated into a large capacity valve having ratings similar to smaller valves. The preferred embodiment can handle 2,500 p.s.i. at 650° F. with a maximum temperature range from cryogenic to 1,500° F.

Because of the much larger capacity of the valve, the range of application is much wider than smaller models. Its wide ranges of temperature and pressure capabilities make it a wise choice for cryogenic fluids as well as hot oil, chemicals and steam lines. The extra reliability of the bellows seal principle makes it the safest choice for systems where even very small system fluid leakage could be dangerous or expensive. The bellows seal eliminates all packings, O-rings, and other sliding seals. There is zero leakage to atmosphere. In systems which are very sensitive to moisture it does away with atmospheric contamination. There is also a secondary system to prevent leakage in the unlikely event of a bellows failure.

The inverted bellows (wherein system fluid acts on the external surface of the bellows rather than the bellows interior) allows much more rapid heat transfer in systems where the valve body must be heated to keep the system fluid hot. The inverted bellows also increases bellows life in the larger size valve. It helps in rapid evacuation of the bellows for ultra-high vacuum service, and makes cleaning the valve simplier.

The valve of this invention may be operated by means of a remote operator in lieu of handle 20. As an example a double acting air cylinder or a normally closed air cylinder may be used. Air operated bellows valves provide for remote control of tough-to-handle fluid systems such as nuclear fueled power generating plants.

What is claimed:

1. A valve comprising in combination:
   a body having a bore, an inlet and an outlet, a fluid passageway interconnecting said inlet, outlet and said bore, and an annular sealing seat in said passageway substantially coaxial with said bore;
   a bonnet connected to said body and having a central passage aligned substantially coaxial with said bore;
   an actuator projecting through said central passage;
   a stem connected to said actuator, the lower end of said stem projecting into said bore and including sealing means to engage said seat, said stem adapted to be moved into and out of engagement with said seat upon movement of said actuator;
   a bellows surrounding a portion of said stem, the lower end of said bellows being bonded to said stem with the upper end being bonded to weld ring means, the bond between said bellows and said weld ring means comprising weld means substantially at the periphery of said bellows;
   concentric circumferential grooves in said weld ring means with at least one of said grooves opening upwardly toward a flat face on the lower end of said bonnet, said upwardly opening groove retaining a sealing O-ring compressed between said flat face and the walls of said upwardly opening groove;
   another of said grooves being sufficiently close to an edge of said ring means as to form a projecting flange of radial thickness not substantially greater than the thickness of said bellows, said bellows periphery being welded to said flange substantially at its crest;
   said weld ring means being clamped between the valve body near the upper terminus of said bore and said bonnet near the lower terminus of said central passage, the internal diameter of said central passage being less than the internal diameter of said bore;
   a relieved surface adjacent said ring means merging with one of (a) said passage lower terminus or (b) said bore upper terminus;
   the maximum diameter of said relieved surface being greater than the diameter of the crest of the flange welded to said bellows;
   sealing means between said valve body and said weld ring means.

2. The invention of claim 1 in which said sealing means comprises a sealing ring interposed between said valve body and said weld ring means.

3. The invention of claim 1 in which said relieved surface is an outwardly flared surface defined on said bonnet and said flange of said weld ring means is defined substantially adjacent the inner surface of said weld ring means with said bellows upper end welded to said flange in substantially a vertical position.

4. The invention of claim 1 in which said relieved surface is an outwardly flared surface defined on said valve body and said flange of said weld ring means is defined at the bottom most surface of said weld ring means with said upper end of said bellows welded to said flange in substantially a horizontal position.

5. The invention of claim 1 in which the width of the crest of the flange of said weld ring means is not substantially less than two times nor substantially greater than three and one-half times the thickness of said bellows.

6. The invention of claim 1 in which said sealing means comprises a weld bead at the external surface of said valve body and said weld ring means.

7. The invention of claim 6 in which a cooperating rise and recess are defined in said body and said weld ring means.

8. A valve comprising in combination:
a body having a bore, an inlet and an outlet, a fluid passageway interconnecting said inlet, outlet and said bore, and an annular sealing seat in said passageway substantially coaxial with said bore;
a bonnet connected to said body and having a central passage aligned substantially coaxial with said bore;
an actuator projecting through said central passage and being selectively rotatable in said passage;
a substantially non-rotatable stem having a lower end projecting into said bore and including sealing means to engage said seat, said stem adapted to be moved along said bore into and out of engagement with said seat responsive to rotational movement of said actuator;
connection means between said stem and said actuator;
said connection means comprising a cup-shaped portion on one of said actuator and said stem and a projecting end on the other of said actuator and said stem with opposed semicircular shaped grooves defined in both said cup-shaped portion and said projecting end;
a pair of detent means projecting from said cup-shaped portion and into said opposed grooves for locking said stem and said actuator together while allowing relative rotational movement therebetween;
the opposed faces of said cup-shaped portion and said projecting end having a concave, substantially cone-shaped surface for engaging a friction reducing ball held therebetween to minimize the amount of torque transmitted from said actuator to said stem during rotation of said actuator to effect movement of said stem into and out of engagement with said seat.

9. The invention of claim 8 in which said detents are positioned substantially 180° apart in order to impart balanced thrust forces to said stem from said actuator.

10. The invention of claim 8 in which the diameter of the semicircular groove in said stem is greater than the diameter of said detents.

11. A valve comprising in combination:
a body portion having a bore, an inlet and an outlet, a fluid passageway interconnecting said inlet, outlet and said bore, and an annular sealing seat in said passageway substantially coaxial with said bore;
a bonnet connected to said body and having a central passage aligned substantially coaxial with said bore;
an actuator projecting through said central passage in threaded engagement with said bonnet;
secondary seal means at said actuator and said bonnet and positioned above the threads of said actuator and said bonnet;
a substantially non-rotatable stem, the lower end of said stem projecting into said bore and including sealing means to engage said seat, said stem adapted to be moved into and out of engagement with said seat in response to rotation of said actuator in said threaded engagement;
a bellows surrounding a portion of said stem, the lower end of said bellows being bonded to said stem with the upper end being bonded to ring means;
said ring means being clamped between said valve body and said bonnet;
connection means between said actuator and said stem for locking said actuator and said stem together while allowing for relative rotational movement therebetween, said connection means being positioned above said ring means;
an externally projecting shoulder extending from said actuator and positioned above said connection means, a complementary internally extending shoulder defined on said bonnet, said shoulders together defining a back seat seal.

12. The invention of claim 11 in which the sealing means of said stem comprises a tip connected to the stem end, said tip including a polygonal body coaxially aligned with said stem, said polygonal body having a plurality of guiding corners for engaging the bore wall of said body, the lower end of said polygonal body including a cavity opening toward said annular sealing seat, and a plug disposed in said cavity.

13. The invention of claim 11 wherein the interengaging threads of said actuator and said bonnet serve to reciprocate the stem between open and closed positions, the ratio of the axial length of the threads to thread diameter being not substantially less than 1.5.

14. The invention of claim 11 in which at least one port is defined in said bonnet between said back seat seal and the interengaging threads of said actuator and said bonnet.

15. The invention of claim 11 in which said connection means is defined as a cup-shaped member on either one of said actuator or said stem and a projecting end on the other of said actuator or said stem with the opposed faces of said cup-shaped member and said projecting end each having a concave, substantially cone-shaped surface for abutting a friction reducing ball held therebetween to minimize the amount of torque transmitted from the rotatable actuator to the vertically reciprocatable stem.

16. The invention of claim 15 in which the externally projecting shoulder of said actuator is defined by the upper surface of said cup-shaped portion.

17. The invention of claim 15 in which opposed semicircular shaped grooves are defined in said cup-shaped portion and said projecting end and a pair of detent means project from the wall of said cup-shaped portion into said grooves for locking the stem and actuator together while allowing relative rotational movement.

18. The invention of claim 17 in which the detent means are spaced 180° apart so as to transmit balanced thrust forces to said stem from said actuator.

19. The invention of claim 17 in which the diameter of the groove in said stem is larger than the diameter of said detent means.

20. The invention of claim 11 in which the operating stroke of the stem from the fully closed position to the fully opened position moves the bellows from a state of extension to a state of compression.

21. The invention of claim 20 in which the bellows in the valve closed position is extended 20 percent beyond the free state bellows position, and the bellows in the valve opened position is compressed 80 percent beyond the free state bellows position.

22. A valve comprising in combination:
a body having a bore, an inlet and an outlet, a fluid passageway interconnecting said inlet, outlet and said bore, and an annular sealing seat in said passageway substantially coaxial with said bore;
a substantially non-rotatable stem, the lower end of said stem projecting into said bore and including sealing means to engage said seat, said stem adapted to be selectively longitudinally moved within said bore into and out of sealing engagement with said seat;
a bellows surrounding a portion of said stem, said bellows having one end bonded to seal means at said stem and the other end bonded to seal means at said body;
said sealing means of said stem comprising a tip connected to the stem end, said tip including a polygonal body coaxially aligned with said stem, said polygonal body having a plurality of guiding corners for engaging the bore wall of said body, the lower end of said polygonal body including a cavity opening toward said annular sealing seat, and a plug disposed in said cavity.

* * * * *